(12) United States Patent
Potocki

(10) Patent No.: US 12,390,961 B2
(45) Date of Patent: Aug. 19, 2025

(54) AUTOMATIC CLEANING SYSTEM AND METHOD FOR REMOVING DEBRIS FROM DIES

(71) Applicant: MAGNA INTERNATIONAL INC., Aurora (CA)

(72) Inventor: John Richard Potocki, Armada, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 2 days.

(21) Appl. No.: 18/273,882

(22) PCT Filed: Jan. 24, 2022

(86) PCT No.: PCT/US2022/013480
§ 371 (c)(1),
(2) Date: Jul. 24, 2023

(87) PCT Pub. No.: WO2022/159800
PCT Pub. Date: Jul. 28, 2022

(65) Prior Publication Data
US 2024/0075657 A1    Mar. 7, 2024

Related U.S. Application Data

(60) Provisional application No. 63/141,114, filed on Jan. 25, 2021.

(51) Int. Cl.
*B29C 33/72* (2006.01)
*B08B 3/02* (2006.01)

(52) U.S. Cl.
CPC .............. *B29C 33/72* (2013.01); *B08B 3/022* (2013.01)

(58) Field of Classification Search
None
See application file for complete search history.

(56) References Cited

U.S. PATENT DOCUMENTS

| 4,520,643 A | 6/1985 | Werner et al. |
| 5,544,667 A | 8/1996 | Landua et al. |
| 6,220,334 B1 * | 4/2001 | Tomita .................. B22D 43/00 |
| | | 134/107 |
| 2002/0153117 A1 | 10/2002 | Allor et al. |
| 2016/0256924 A1 | 9/2016 | Regusewicz |

FOREIGN PATENT DOCUMENTS

| CN | 108543752 A | 9/2018 |
| CN | 109967678 A | 7/2019 |
| EP | 0919311 A1 | 6/1999 |
| JP | 06328460 A | 11/1994 |

* cited by examiner

*Primary Examiner* — Eric W Golightly
(74) *Attorney, Agent, or Firm* — Dickinson Wright PLLC

(57) ABSTRACT

An automatic system (10) and method for cleaning grease and debris from a die (12), such as a die (12) which stamps or trims aluminum or steel sheets used to form exterior vehicle body panels and thus should be free of dents and scratches, is provided. The system (10) includes multiple stations (22) and die handling arms (18), (20) or a conveyor (28) for moving the die (12) between the multiple stations (22). One of the stations (22) includes a spraying device (26) for cleaning and rinsing the die (12). Another one of the stations (22) includes an air blower (24) for removing loose debris from the die (10) and also for drying the die (10) after the washing step.

13 Claims, 12 Drawing Sheets

AUTOMATIC CLEANING SYSTEM AND METHOD FOR REMOVING DEBRIS FROM DIES

CROSS-REFERENCE TO RELATED APPLICATIONS

This U.S. National Stage Patent Application claims the benefit of PCT International Patent Application Serial No. PCT/US2022/013480 filed Jan. 24, 2022 entitled "AUTOMATIC CLEANING SYSTEM AND METHOD FOR REMOVING DEBRIS FROM DIES" which claims the benefit of and priority to U.S. Provisional Patent Application Ser. No. 63/141,114, filed Jan. 25, 2021, titled "Automatic Cleaning System For Removing Debris From Dies," the entire [disclosure] disclosures of which are hereby incorporated by reference in their entirety.

BACKGROUND

1. Technical Field

The invention relates to a system and method for cleaning dies used to trim, stamp, or otherwise form metal components, for example exterior vehicle body panels formed of aluminum or steel.

2. Related Art

Exterior vehicle body panels are typically formed by stamping, trimming, or otherwise cutting a metal sheet in a die. Slivers, or other small scraps of metal, typically come off the sheet during the cutting process and then accumulate on the die. The slivers, if left on the die, create scratches or dents on the panels formed during subsequent cutting steps, which are not acceptable for many types of vehicle components. For example, example exterior vehicle body panels must have a smooth appearance and be free of dents and scratches. Additional processing steps, and thus additional time and costs, are required to remove any scratches or dents on such components.

To avoid scratches and dents, grease is typically applied to the die to collect the slivers and other debris. However, the die must be cleaned frequently to remove the grease containing the slivers and other debris which cause the stretches and dents. The current die washing process is labor and time intensive. The sliver filled grease is difficult to remove, and the die is very large and heavy. For example, the die, including an upper die half and lower die half, can have a total weight ranging from 70,000 to 95,000 pounds.

SUMMARY

One aspect of the invention provides an automatic system for efficiently cleaning a die. The system includes an air blower for blowing air onto the die, a spraying device for spraying liquid onto the die, and a human machine interface for activating the air blower and the spraying device.

Another aspect of the disclosure provides an automatic method for efficiently cleaning a die. The method includes activating an air blower and a spraying device using a human machine interface, blowing air onto the die with the activated air blower, and spraying liquid onto the die with the activated spraying device.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF EXAMPLE EMBODIMENTS

Example embodiments will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
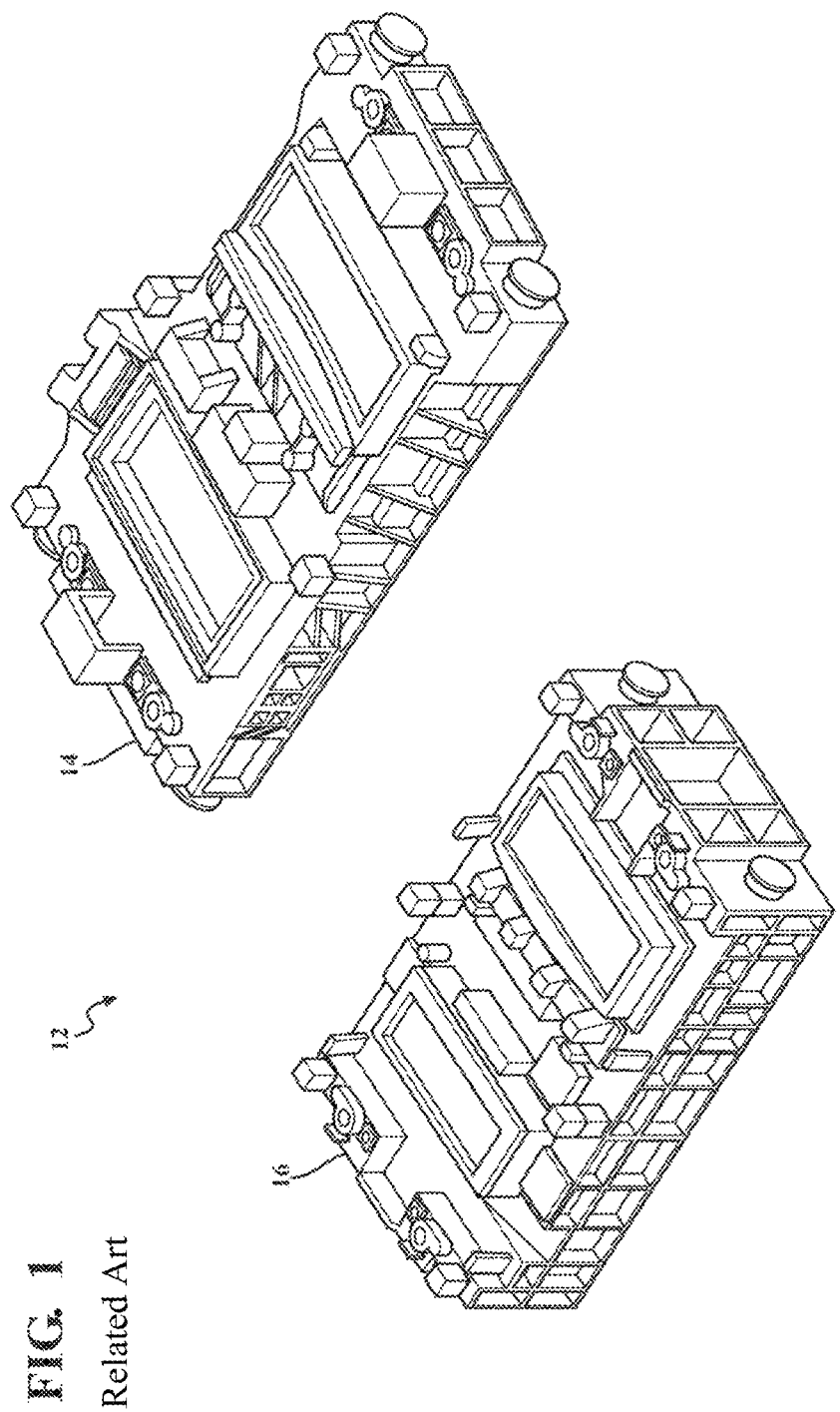
FIG. 1 illustrates an example die, including an upper die half and a lower die half, which can be cleaned by the system and method of the present invention.

One aspect of the invention provides an automatic system 10 for cleaning grease filled with metal slivers and other debris from a die 12. An example of the die 12 is shown in FIG. 1 and includes an upper die half 14 and a lower die half 16. The type of die 12 typically cleaned by the system 10 according to the invention is a die 12 which stamps, trims, or otherwise cuts metal. For example, the die 12 can be the type used to cut aluminum or steel sheets which form exterior vehicle body panels and thus should be free of dents and scratches which are oftentimes formed due to slivers on the die 12. However, various other die designs can be cleaned by the system 10 of the present invention. The die 12 can be formed of steel or another material, typically a metal material.

As indicated above, grease is typically applied to the die 12 prior to any cutting step to collect the slivers and other debris generated during the cutting step. However, another more environmentally friendly substance could be used to collect the slivers and debris instead of the grease. The grease and debris must be frequently washed and removed from the die 12, to prevent the debris from creating dents and scratches on the metal sheets or other parts which are formed and/or cut in the die 12.

Figure 2:
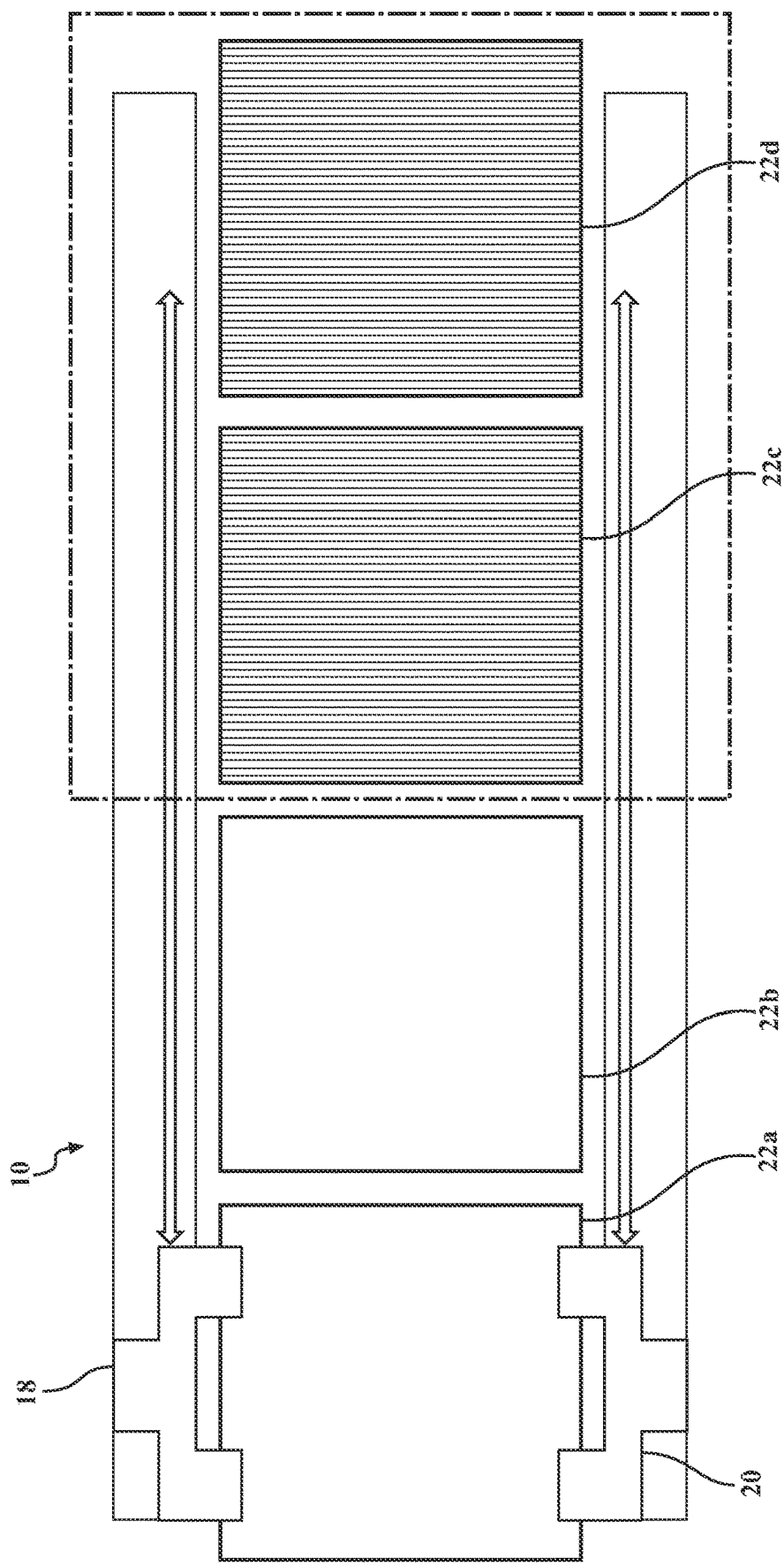
FIG. 2 is a plan view of a system for cleaning the die according to a first example embodiment, wherein the system includes material handling arms.
Figure 3:
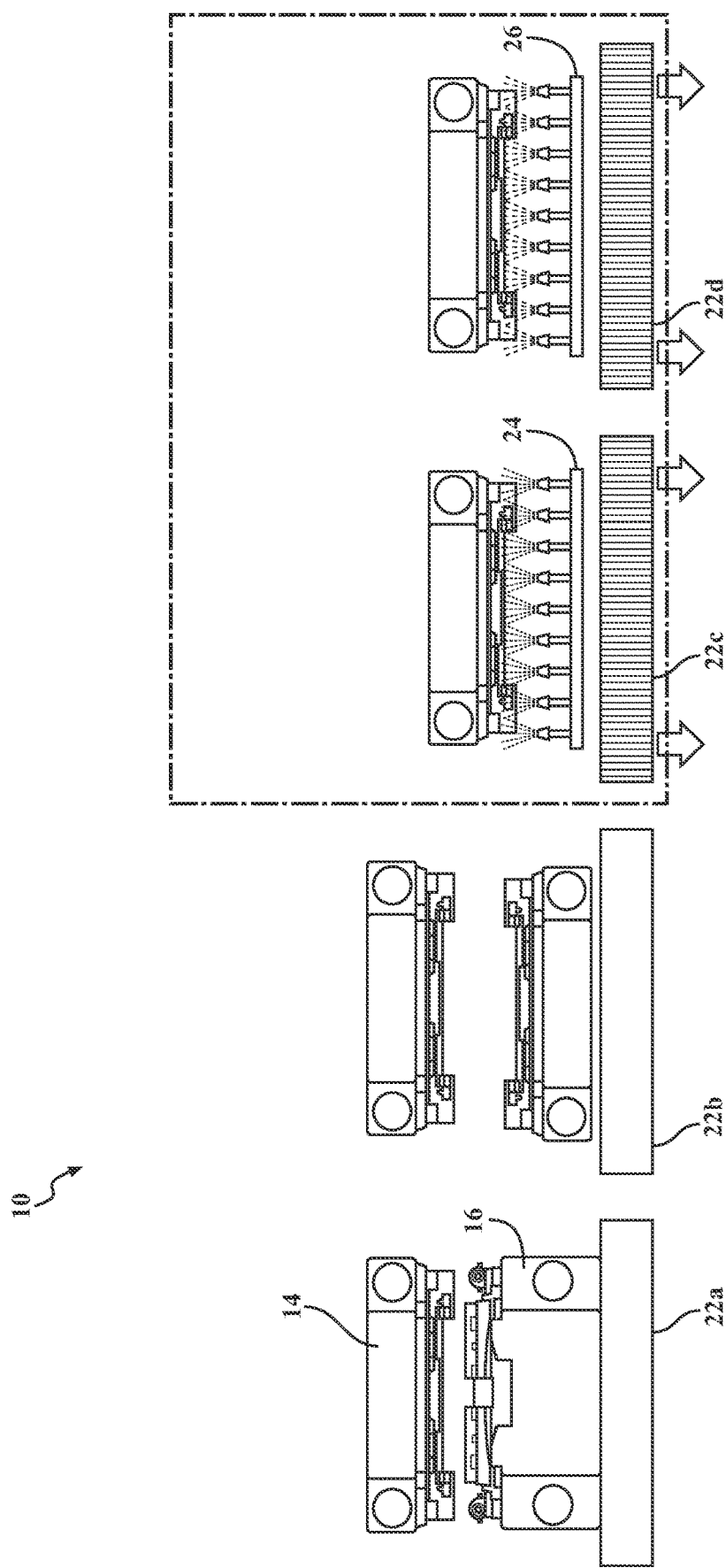
FIGS. 3 and 4 illustrate a process for cleaning the die using the system of the first example embodiment.
Figure 4:
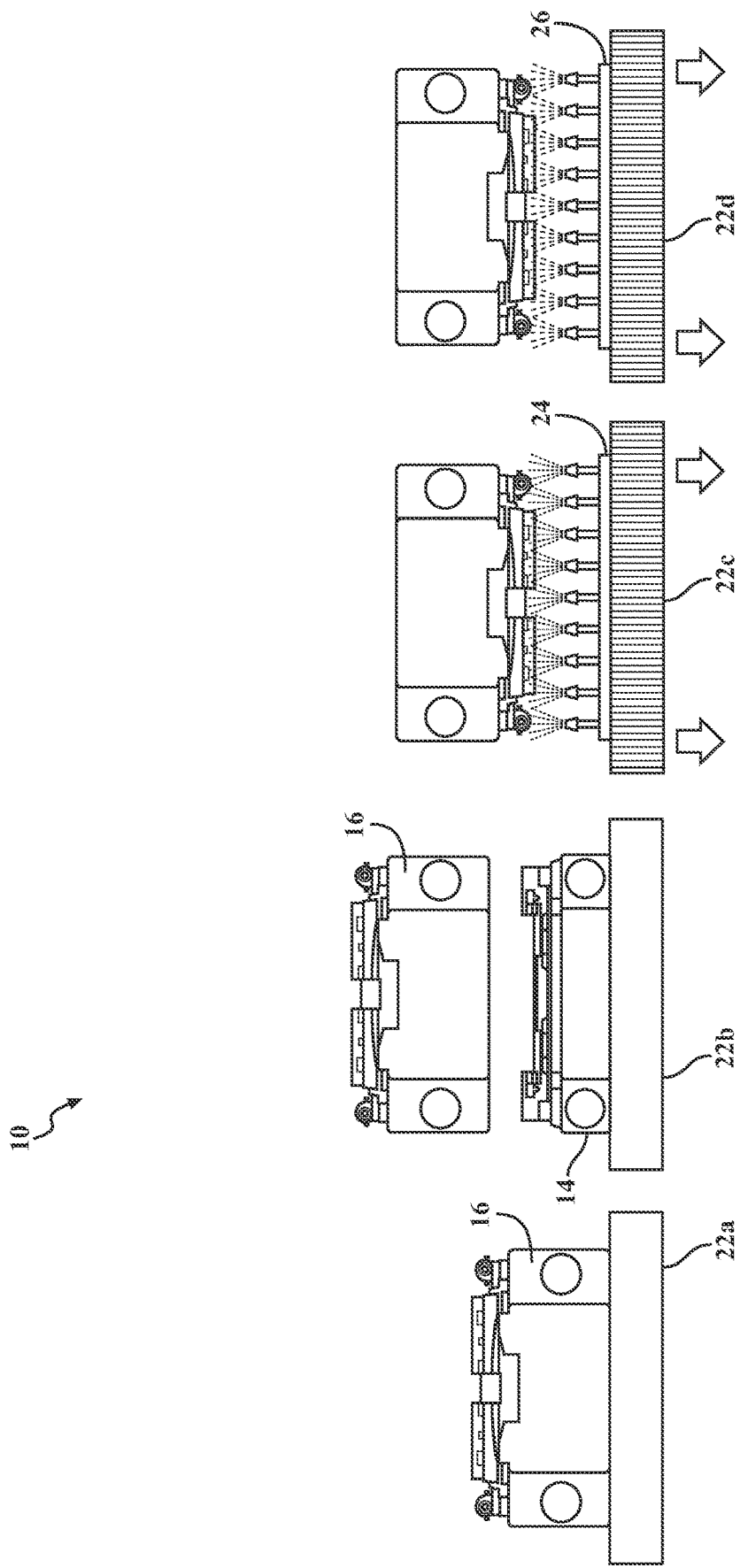

The system 10 used to clean the grease and debris from the die 12 according to a first example embodiment is shown in FIGS. 2-4. The system 10 includes upper and lower die handling arms 18, 20 for lifting, lowering, and conveying the upper die half 14 and lower die half 16 to multiple stations 22 used in the cleaning process. A crane operator can use a human machine interface on a panel to quickly turn on the system 10 and activate the die handling arms 18, 20. The system 10 can be controlled by the operator using the human machine interface. Once the system is active or turned on, the system 10 and method can run automatically. According to the first example embodiment, the system 10 includes a first station 22a, second station 22b, third station 22c, and fourth station 22d. The first station 22a is for loading and unloading of the die 12. The second station 22b is for polishing the die 12. The third station 22c includes an air blower 24 for blowing off loose debris prior to washing the die 12 and also drying the die 12 after washing. The fourth station 22d is includes a spraying device 26 for washing the die 12 with a cleaning solution and water.

FIG. 3 illustrates the cleaning of the upper die half 14 according to the first example embodiment. The upper die half 14 begins at the first station 22a and the die handling arms 18, 20 move the upper die half 14 to the third station 22c to blow out the loose slivers. Next, the die handling arms 18, 20 move the upper die half 14 to the fourth station 22d to degrease, wash the upper die half 14 with a cleaning solution, and then rinse the upper die half 14 with water. An anti-rust spray can also be applied to the upper die half 14, if desired. According to this embodiment, the air blower 24 and the spraying device 26 are located below the upper die half 14. This arrangement is beneficial as it allows the debris and used cleaning solution and water to collect below the upper die half 14 for convenient removal. After rinsing at the fourth station 22d, the upper die half 14 is conveyed back to the third station 22c for drying by the air blower 24. After drying, the upper die half 14 is conveyed to the second station 22b and inverted. At the second station 22b, the upper die half 14 is inspected to confirm the debris is removed and polished. Finally, grease is re-applied to the upper die half 14 in preparation for future forming, stamping, trimming, and/or other cutting steps.

FIG. 4 illustrates the cleaning of the lower die half 16 according to the first example embodiment. After the upper die half 14 is processed, the handling arms 18, 20 move the lower die half 16 from the first station 22a to the third station 22c and rotate the lower die half 16 180 degrees. At the third station 22c, the air blower 24 blows the loose slivers and debris off the lower die half 16. Next, the die handling arms 18, 20 move the lower die half 16 to the fourth station 22d to degrease, wash the lower die half 16 with a cleaning solution, and then rinse the lower die half 16 with water. An anti-rust spray can also be applied to the lower die half 16 by the spraying device 26 if desired. According to this embodiment, the air blower 24 and the spraying device 26 are located below the lower die half 16. This arrangement is beneficial as it allows the debris and used cleaning solution and water to collect below the lower die half 16 for convenient removal. After rinsing at the fourth station 22d, the lower die half 16 is conveyed back to the third station 22c for drying by the air blower 24. After drying, the lower die half 16 is conveyed to the first station 22a and inverted. At the first station 22a, the lower die half 16 is inspected to confirm the debris has been removed and polished. Grease is re-applied to the lower die half 16 in preparation for future forming, stamping, trimming, and/or other cutting steps. Finally, the upper die half 14 is conveyed from the second station 22b back to the first station 22a and placed on the lower die half 16.

The system 10 used to clean the grease and debris from the die 12 according to a second example embodiment is shown in FIGS. 5-8. This system 10 can also run automatically; it can be activated and controlled by a single operator using the human machine interface. The system 10 includes a conveyor 28 for moving the upper die half 14 and lower die half 16 to multiple stations 22 used in the cleaning process. According to the second example embodiment, the system 10 includes a first station 22a, second station 22b, third station 22c, fourth station 22d, and a fifth station 22e. According to this embodiment, the upper die half 14 and the lower die half 16 can be processed simultaneously using multiple stations 22 at the same time.

Figure 5:
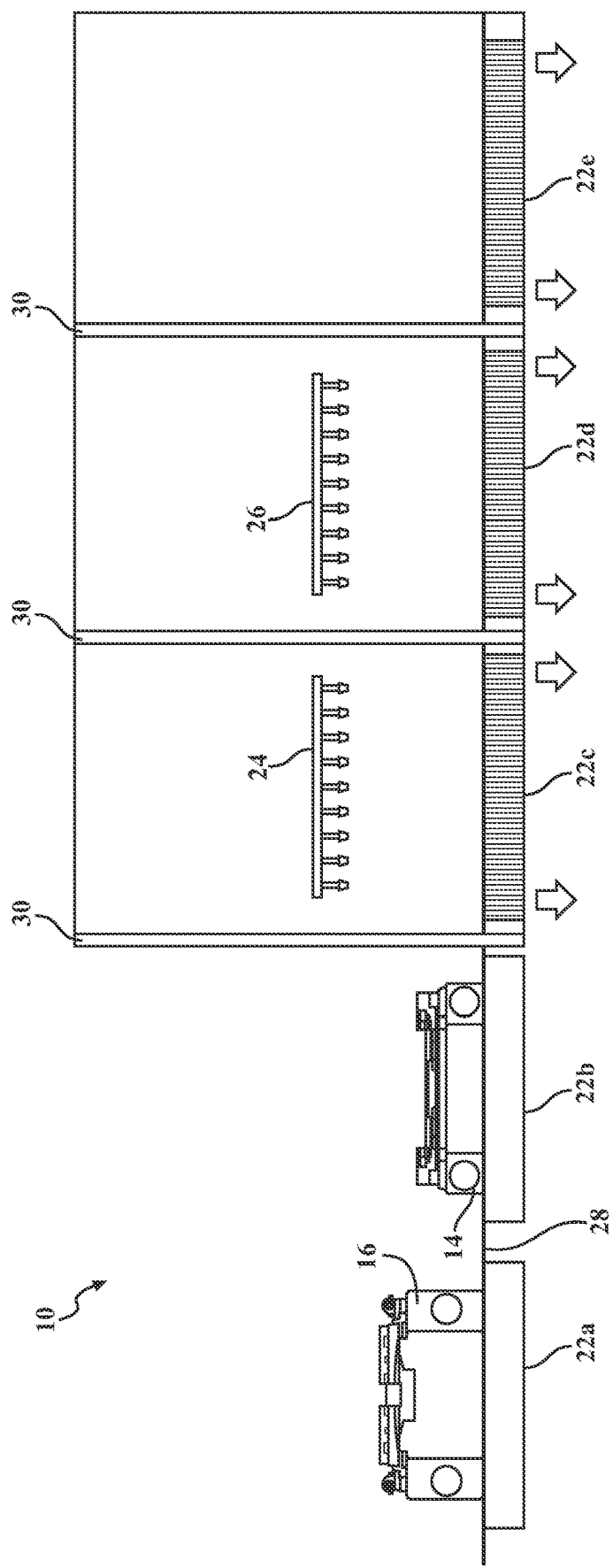
FIGS. 5-12 illustrate a system and process for cleaning the die according to a second example embodiment, wherein the system includes a conveyor.

The first step of this second example embodiment is shown in FIG. 5. During the first step, the upper and lower die halves 14, 16 are loaded onto a platform at the first station 22a, for example by a crane. The crane then removes the upper die half 14 from the lower die half 16, rotates the upper die half 14 180 degrees, and places the upper die half 14 at the second station 22b.

Figure 6:
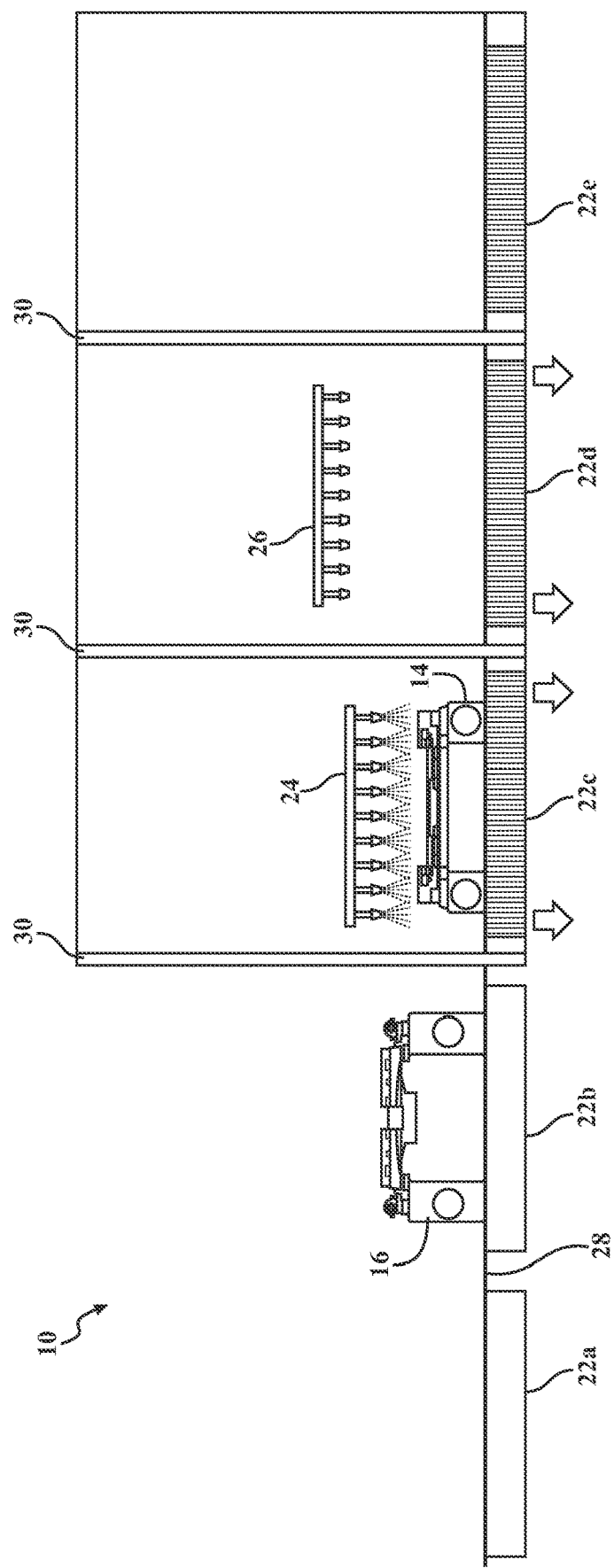

As shown in FIG. 6, the second step of this example embodiment includes conveying the upper and lower die halves 14, 16 using the conveyor 28 so that the upper die half 14 is located at the third station 22c and the lower die half 16 is located at the second station 22b. The third station 22c includes the air blower 24 for blowing off loose debris prior to washing the upper die half 14. The system 10 includes roll up doors 30 around the third station 22c to keep debris within the third station 22c for easy removal. The roll up doors 30 can be formed of vinyl or steel. According to this embodiment, the air blower 24 can move horizontally along the length of the upper die half 14 to efficiently remove debris from the entire surface of the upper die half 14. The air blower 24 can also move vertically toward and away from the upper die half 14. Thus, the air blower 24 can accommodate dies 12 of various different sizes. The lower die half 16 remains idle at the second station 22b while the debris is removed from the upper die half 14 at the third station 22c.

Figure 7:
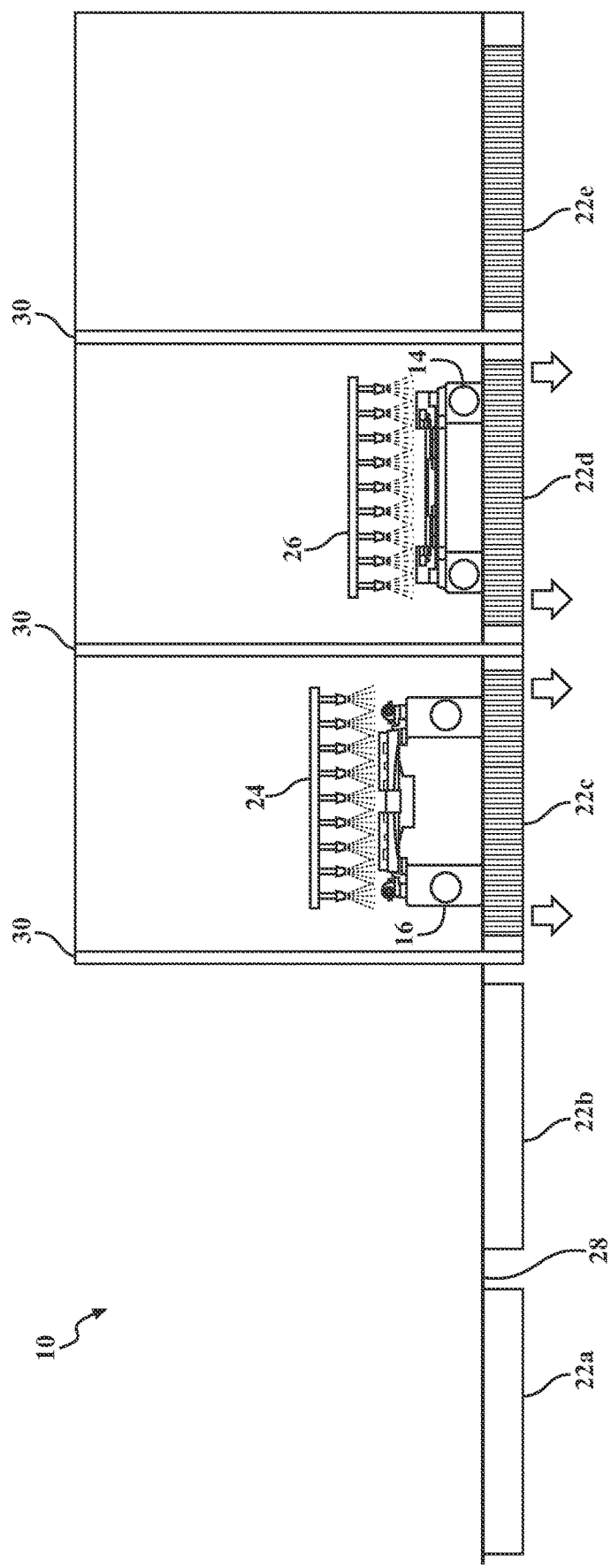

As shown in FIG. 7, the third step includes conveying the upper die half 14 to the fourth station 22d and conveying the lower die half 16 to the third station 22c. During the third step, the debris is blow out of the lower die half 16 at the third station 22c while the upper die half 14 is washed at the fourth station 22d. The roll up doors 30 also surround the fourth station 22d to prevent waste water from escaping the fourth station 22d. According to this embodiment, the spraying device 26 can move horizontally along the length of the upper die half 14 to efficiently clean the entire surface of the upper die half 14. The spraying device 26 can also move vertically toward and away from the upper die half 14.

Figure 8:
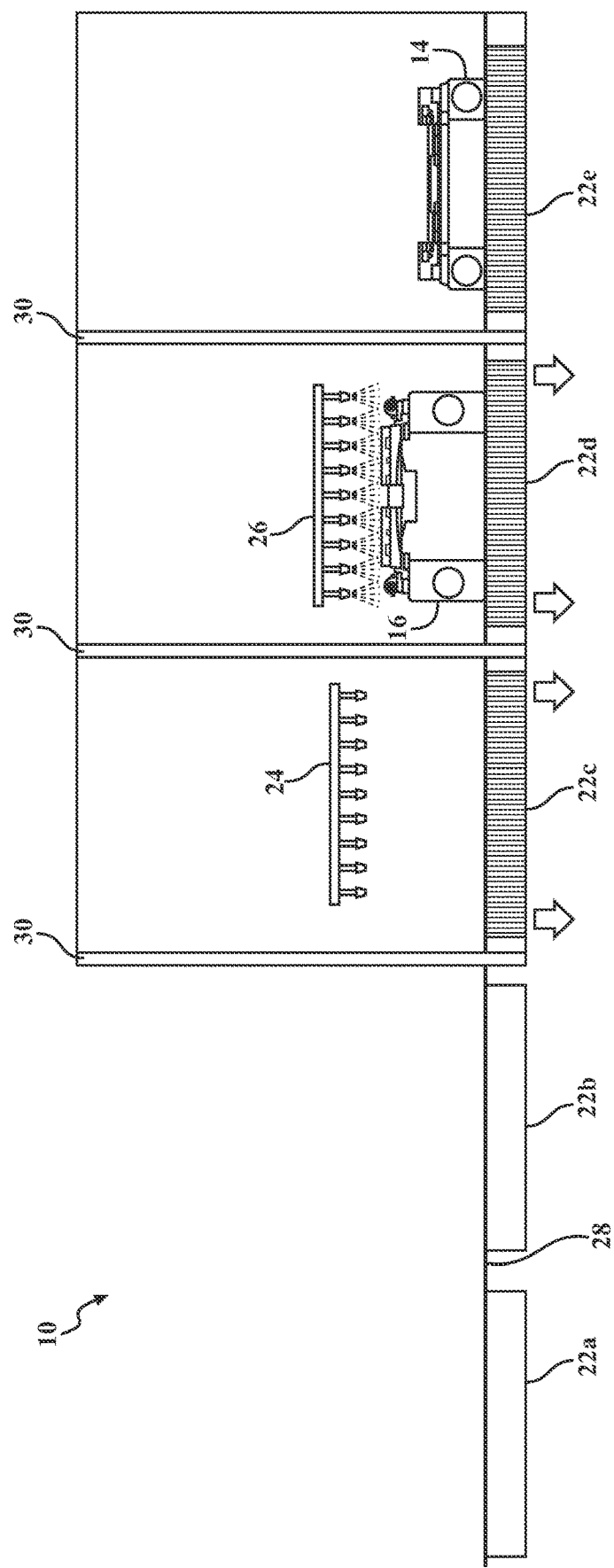

As shown in FIG. 8, the fourth step of this example embodiment includes conveying the upper die half 14 to the fifth station 22e while conveying the lower die half 16 to the fourth station 22d. The upper die half 14 remains idle at the fifth station 22e while the spraying device 26 cleans the lower die half 16 at the fourth station 22d.

Figure 9:
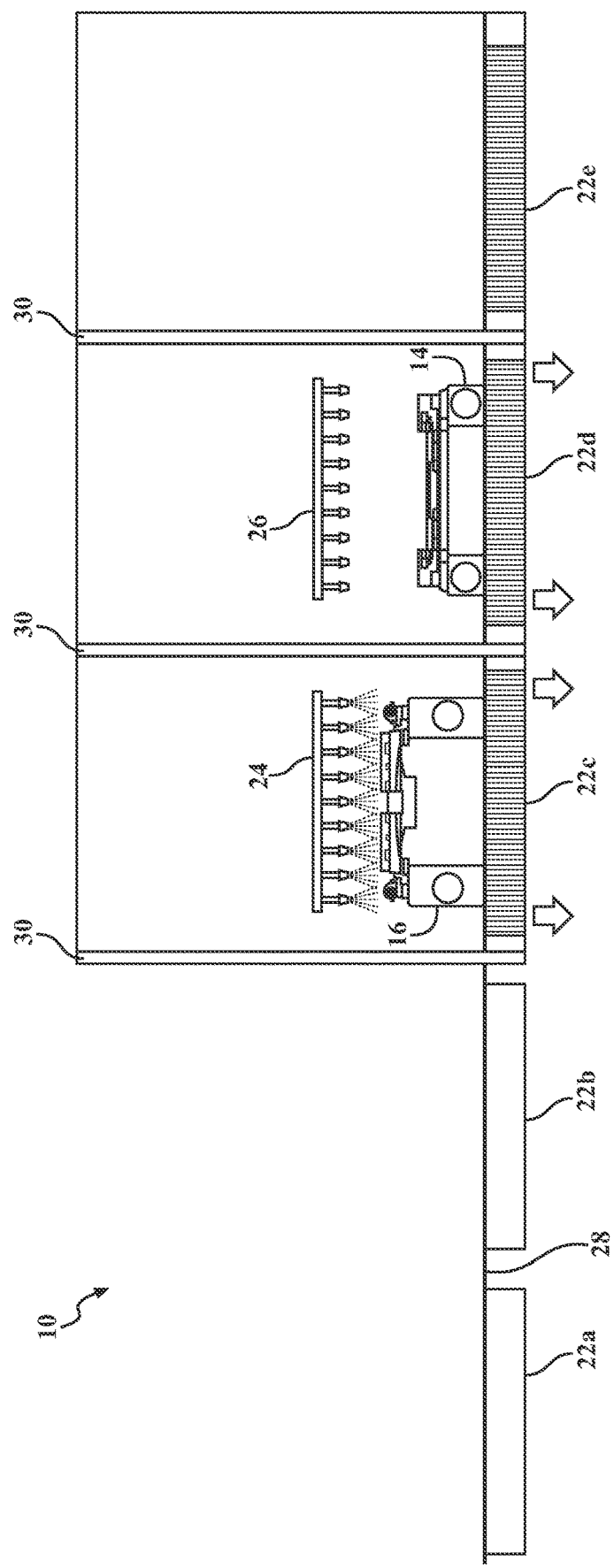

As shown in FIG. 9, the fifth step includes conveying the lower die half 16 to the third station 22c while conveying the upper die half 14 to the fourth station 22d. The roll up doors 30 are raised and lowered when the die halves 14, 16 travel in or out of the third station 22c and/or the fourth station 22d. The upper die half 14 remains idle at the fourth station 22d while the lower die half 16 is dried by the air blower 24.

Figure 10:
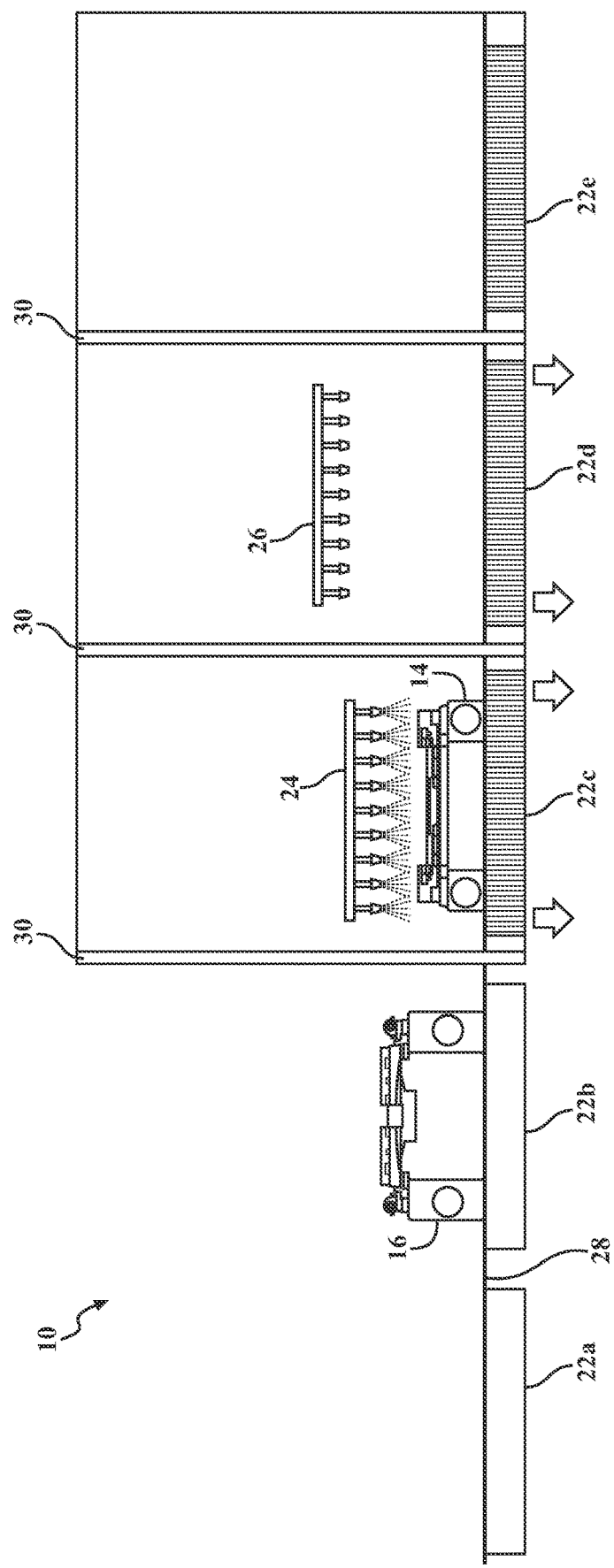

The sixth step includes conveying the lower die half 16 to the second station 22b while conveying the upper die half 14 to the third station 22c, as shown in FIG. 10. The lower die half 16 remains idle at the second station 22b while the upper die half 14 is dried by the air blower 24.

Figure 11:
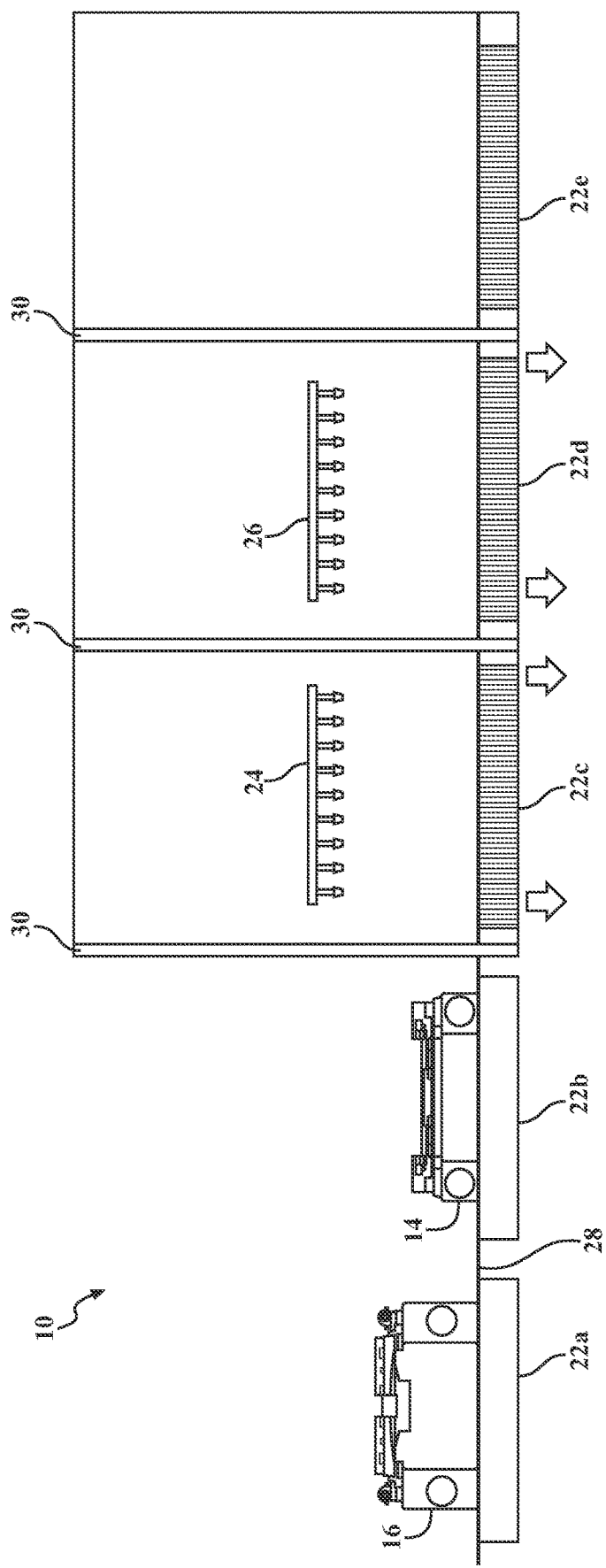

The seventh step includes conveying the lower die half 16 to the first station 22a while conveying the upper die half 14 to the second station 22b, as shown in FIG. 11. At the first station 22a, the lower die half 16 is inspected, polished, and repaired if needed. Grease is then re-applied to the lower die half 16 in preparation for future forming, stamping, trimming, and/or other cutting steps. While the lower die half 16 is being inspected, polished, repaired, and greased at the first station 22*a*, the upper die half 14 is inspected, polished, repaired, and greased at the second station 22*b*.

Figure 12:
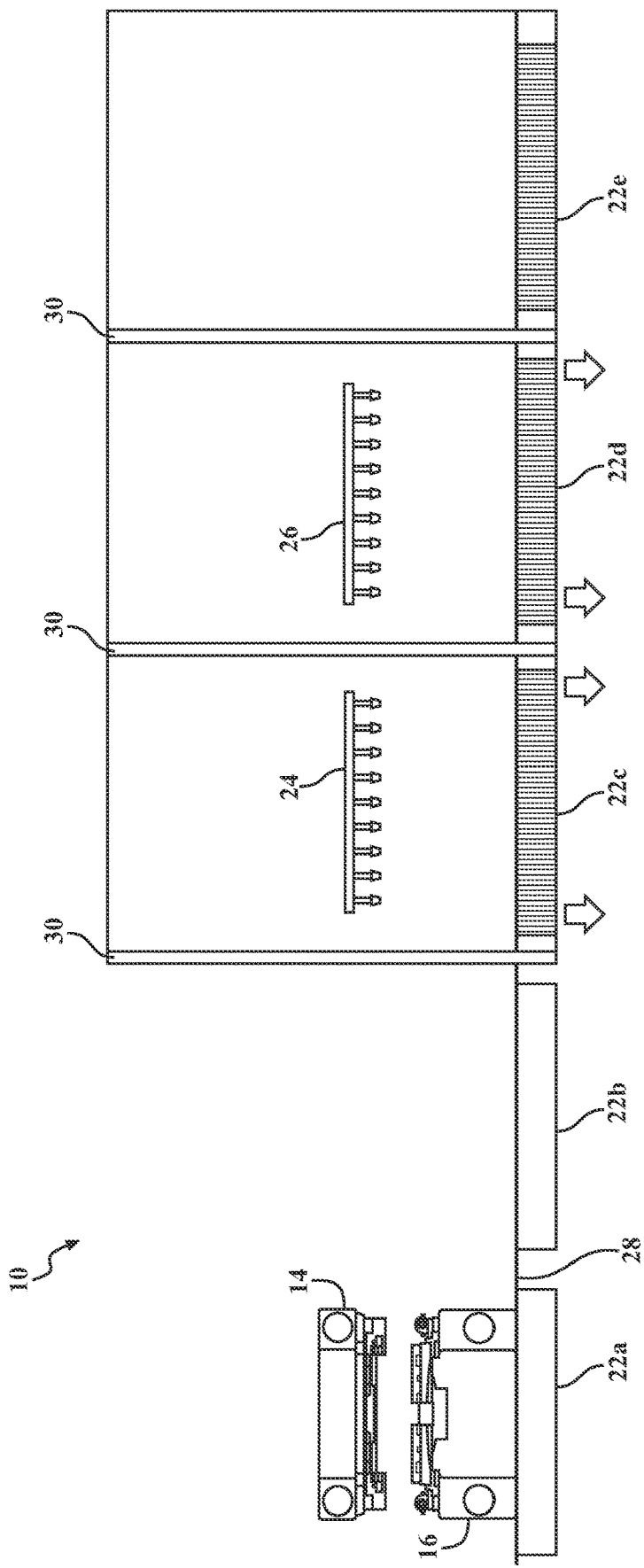

As shown in FIG. 12, the eighth step of this embodiment includes placing the upper die half 14 back on top of the lower die half 16, and then removing the die 10 from the first station 22*a*. A crane can be used to move the upper die half 14 and remove the die 12.

The system 10 for cleaning the die 12 according to the example embodiments is able to reduce the time required to clean the grease filled slivers and debris from the die 10 by approximately 60%. According to conventional methods, it takes about 2.6 hours to clean the die 12. The system 10 of the present disclosure, however, is capable of completing the entire cleaning process (loading, washing, inspecting, re-greasing, and unloading) in about an hour. The system 10 also requires about 50% less labor to clean the die 12. Only a single crane operator is typically required to operate the system 10 according to embodiments.

The design of the equipment used in the system 10, including the air blower 24 and spraying device 26, can vary. The system 10 variables can also vary.

For example the air blower 24 can blow air to remove loose slivers and debris prior to the washing step, and also dry the die half 14 or 16 after the washing step. According to one embodiment, the air blower 24 blows the air at approximately 40,000 F.P.S. Electric or natural gas heat can be used to heat the air and also the water used in the spraying device 26. The air blower 24 can be an Air Cannon and can provide the air in the form of an air knife or spiral. The air blower 24 typically moves linearly along the die half 14 or 16. An intake could be placed in a pit below the die 12 to create a down draft in the system 10. There should not be any standing water in pockets of the die half 14 or 16 after drying.

The spraying device 26 typically sprays a degreaser onto the die half 14 or 16. The type of degreaser, nozzle pattern (fan pattern, stream, or spiral), travel speed, volume required, distance from the die half, and soak time can be adjusted depending on the design of the die 12 and amount of grease. The spraying device 26 typically moves linearly along the die half 14 or 16 to apply the de-greaser.

The spraying device 26 also typically sprays soap onto the die halves 14, 16 for cleaning. The type of soap, quantity of water and soap, velocity, water temperature, nozzle pattern (fan patter, stream, or spiral), travel speed, and distance from the die half 14 or 16 can be adjusted.

The parameters of the rinsing step to remove the soap and other debris can also be adjusted. The volume of water, water velocity, water temperature, nozzle pattern (fan patter, stream, or spiral), spray device travel speed, and spray device distance from the die half 14 or 16 can all be adjusted.

The system 10 also includes waste management features in order to efficiently remove the used water and debris from the system 10. For example, the system 10 can include a waste water evaporator, automatic tank clean-out, perimeter duct exhaust system, ultra-fine particle filtration, oil and grease skimmer, automatic pump shut down, low water safety shutdown, and an automatic water make-up to provide the water to the spraying device 26.

As indicated above, a significant advantage of the system 10 and method of the present invention is that it is automatic. The system 10 can be programmed and controlled using a human machine interface. The air blowing conducted by the air blower 24 and the washing cycle conducted by the spraying device 26 can be programmed to the most efficient parameters for the specific die 12 being cleaned. Thus, the parameters are adjusted appropriately for dies 12 of different designs. The system 10 can also be activated by a single operator pushing a button on the human machine interface. Thus, system 10 and method can successfully clean the dies 12 without the extensive labor and time required by comparative systems and methods used to clean such dies 12.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A system for cleaning a die, comprising:
   an air blower for blowing air onto the die,
   a spraying device for spraying liquid onto the die,
   a human machine interface for activating the air blower and the spraying device,
   a first station for loading and unloading the die,
   a second station for polishing or holding the die,
   a third station including the air blower,
   a fourth station including the spraying device, and
   doors surrounding the third station to prevent debris from escaping the third station, and doors surrounding the fourth station to prevent waste water from escaping the fourth station, the doors being capable of rolling up and down.

2. The system of claim 1 including a fifth station for holding the die.

3. The system of claim 1 including an upper handling arm and a lower handling arm for conveying the die to the stations, the upper and lower handling arms being activated by the human machine interface.

4. The system of claim 1 including a conveyor for conveying the die to the stations, the conveyor being activated by the human machine interface.

5. The system of claim 1 including a waste management system for removal of used water and debris.

6. The system of claim 1, wherein the air blower is movable horizontally and vertically to accommodate various sizes of dies, and the spraying device is movable horizontally and vertically to accommodate various sizes of dies.

7. The system of claim 1, wherein the system is capable of running automatically after being activated by the human machine interface.

8. The system of claim 1, wherein the die includes an upper die half and a lower die half, the system further comprising:
   an upper handling arm and a lower handling arm for conveying the upper die half and the lower die half to a plurality of stations, the upper and lower handling arms being activated by the human machine interface, and
   a waste management system for removal of used water and debris, and
   wherein the system is capable of running automatically after being activated by the human machine interface.

9. A system for cleaning a die, comprising:
   an air blower for blowing air onto the die,
   a spraying device for spraying liquid onto the die, a human machine interface for activating the air blower and the spraying device, wherein the die includes an upper die half and a lower die half, the air blower is movable horizontally and vertically to accommodate various sizes of dies, the spraying device is movable horizontally and vertically to accommodate various sizes of dies, the system further comprising:

a conveyor for conveying the upper die half and the lower die half to a plurality of stations, the conveyor being activated by the human machine interface, the plurality of stations including a first station for loading and unloading the upper die half and the lower die half, a second station for holding and/or polishing the upper die half and the lower die half, a third station including the air blower for blowing loose debris off the upper die half and the lower die half prior to washing and for drying the upper die half and the lower die half, a fourth station including the spraying device for washing the upper die half and the lower die half, and a fifth station for holding the upper die half and the lower die half, doors surrounding the third station to prevent debris from escaping the third station, the doors being capable of rolling up and down, doors surrounding the fourth station to prevent waste water from escaping the fourth station, the doors being capable of rolling up and down, a waste management system for removal of used water and debris, and wherein the system is capable of running automatically after being activated by the human machine interface.

10. The system of claim 1, wherein the plurality of stations are disposed consecutively in a straight line.

11. The system of claim 10, wherein the system includes die handling arms for moving the die from one of the stations to another one of the stations, and the human machine interface is disposed on a panel such that an operator can activate the die handling arms via the panel.

12. The system of claim 1, wherein the plurality of stations are disposed consecutively in a straight line, and the plurality of stations include a fifth station following the fourth station, wherein the fifth station is for holding the die.

13. The system of claim 12, wherein the system includes a conveyor for conveying the die from one of the stations to another one of the stations, and the human machine interface is disposed on a panel such that an operator can activate the conveyor via the panel.

* * * * *